US010671081B1

(12) United States Patent
Prats

(10) Patent No.: US 10,671,081 B1
(45) Date of Patent: *Jun. 2, 2020

(54) GENERATING AND UTILIZING NON-UNIFORM VOLUME MEASURES FOR VOXELS IN ROBOTICS APPLICATIONS

(71) Applicant: X Development LLC, Mountain View, CA (US)

(72) Inventor: Mario Prats, Palo Alto, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/386,189

(22) Filed: Apr. 16, 2019

Related U.S. Application Data

(63) Continuation of application No. 15/492,647, filed on Apr. 20, 2017, now Pat. No. 10,303,180.

(51) Int. Cl.
| | |
|---|---|
| *G05D 1/00* | (2006.01) |
| *G05D 1/02* | (2020.01) |
| *B25J 9/16* | (2006.01) |
| *G06T 15/08* | (2011.01) |
| *G06T 7/70* | (2017.01) |

(52) U.S. Cl.
CPC .......... *G05D 1/0246* (2013.01); *B25J 9/1664* (2013.01); *B25J 9/1697* (2013.01); *G06T 7/70* (2017.01); *G06T 15/08* (2013.01); *G06T 2200/04* (2013.01); *Y10S 901/01* (2013.01)

(58) Field of Classification Search
USPC ................................................. 700/245–264
See application file for complete search history.

(56) References Cited

U.S. PATENT DOCUMENTS

| | | | |
|---|---|---|---|
| 6,194,860 B1* | 2/2001 | Seelinger | B25J 5/007 318/586 |
| 8,229,595 B2* | 7/2012 | Seelinger | B25J 9/1697 700/245 |
| 9,347,793 B2* | 5/2016 | Meeker | G06T 17/00 |
| 10,078,333 B1* | 9/2018 | Bajracharya | B25J 9/1697 |

(Continued)

OTHER PUBLICATIONS

Marder-Eppstein, Eitan, et al. "The office marathon: Robust navigation in an indoor office environment." Robotics and Automation (ICRA), International Conference on IEEE, 2010. 8 pages.

(Continued)

*Primary Examiner* — Jonathan L Sample
(74) *Attorney, Agent, or Firm* — Middleton Reutlinger

(57) ABSTRACT

Methods, apparatus, systems, and computer-readable media are provided for generating and utilizing non-uniform volume measures for occupied voxels, where each of the occupied voxels represents an occupied point of an environment of a robot. The volume measure for each of the occupied voxels is a "padding" for the occupied voxel and indicates a volume to be utilized for that occupied voxel. The volume measures for the occupied voxels are non-uniform in that they are not all the same volume measure. During path planning, the non-uniform volume measures of the occupied voxels can be considered as "paddings" for the occupied voxels and the occupied voxels with their corresponding volume measures considered as obstacles.

19 Claims, 7 Drawing Sheets

(56) References Cited

U.S. PATENT DOCUMENTS

| | | | | |
|---|---|---|---|---|
| 10,108,194 | B1* | 10/2018 | Russell | G05D 1/0212 |
| 10,112,297 | B2* | 10/2018 | Shimodaira | B25J 9/1633 |
| 2007/0010913 | A1* | 1/2007 | Miyamoto | B25J 9/1658 |
| | | | | 700/264 |
| 2007/0071311 | A1* | 3/2007 | Rovira-Mas | G06T 7/70 |
| | | | | 382/154 |
| 2007/0239315 | A1* | 10/2007 | Sato | B25J 9/1612 |
| | | | | 700/245 |
| 2013/0325244 | A1* | 12/2013 | Wang | G05D 1/028 |
| | | | | 701/26 |
| 2016/0016312 | A1* | 1/2016 | Lawrence, III | B25J 9/1671 |
| | | | | 700/98 |
| 2016/0023352 | A1* | 1/2016 | Kennedy | B25J 9/06 |
| | | | | 700/259 |
| 2016/0342433 | A1* | 11/2016 | Rencs | G06F 9/44505 |
| 2017/0120449 | A1* | 5/2017 | Matsunami | B25J 9/046 |
| 2017/0157769 | A1* | 6/2017 | Aghamohammadi | B25J 9/1664 |
| 2017/0165835 | A1* | 6/2017 | Agarwal | G05D 1/0217 |
| 2017/0168488 | A1* | 6/2017 | Wierzynski | G05D 1/0061 |

OTHER PUBLICATIONS

Quispe, Ana Huamán, and Mike Stilman. Diverse workspace path planning for robot manipulators. Georgia Institute of Technology, 2012; 17 pages.

Vandapel, Nicolas, James Kuffner, and Omead Amidi. "Planning 3-d path networks in unstructured environments." Robotics and Automation, 2005. ICRA 2005. Proceedings of the 2005 IEEE International Conference; pp. 4624-4629.

Yan, Fei, Yi-Sha Liu, and Ji-Zhong Xiao. "Path planning in complex 3D environments using a probabilistic roadmap method." International Journal of Automation and Computing 10.6 (2013): 525-533.

* cited by examiner

GENERATING AND UTILIZING NON-UNIFORM VOLUME MEASURES FOR VOXELS IN ROBOTICS APPLICATIONS

BACKGROUND

Some robots and/or robot control systems construct and/or maintain a three-dimensional ("3D") model of at least portions of an environment in which the robot operates. For example, a robot may acquire data from a 3D vision component (e.g., a 3D laser scanner or a stereographic camera) viewing a portion of the robot's environment, and map such data to the 3D model. Some 3D models are formed as so-called "voxel-based" 3D models ("3D voxel models"), in which a 3D matrix of voxels are allocated. For example, data points generated by one or more 3D vision components (also referred to as a "3D point cloud") can be projected onto spatially-corresponding voxels of the 3D voxel model.

Further, some robots and/or robot control systems utilize 3D models for various robotics applications, such as path planning. For example, one or more path planning algorithms can utilize a "current" 3D model in generating a path of the robot from a "current position" of the robot to a "target position" of the robot. For instance, the path planning algorithm(s) can be utilized to generate a collision-free path while considering occupied voxels, of a 3D voxel model, as obstacles to be avoided—and while considering unoccupied voxels, of the 3D voxel model, as points through which the collision-free path may pass. In generating a path, all voxels of a 3D voxel model are typically considered to have the same volume. For example, each of the occupied voxels of the 3D voxel model can be transformed into a corresponding cube of a particular volume, and those particular volume cubes considered as obstacles in generating the path.

SUMMARY

The present disclosure is generally directed to methods, apparatus, and computer-readable media (transitory and non-transitory) for generating and utilizing non-uniform volume measures for occupied voxels, where each of the occupied voxels represents an occupied point of an environment of a robot. Each of the occupied voxels is "occupied" based on it corresponding to a data point generated by a 3D vision component of the robot (e.g., a data point of a generated 3D point cloud). In other words, each of the occupied voxels is considered as occupied based on it corresponding to a 3D position that is indicated as occupied by a corresponding 3D vision component generated data point. The volume measure for each of the occupied voxels is a "padding" for the occupied voxel and indicates a volume to be utilized for that occupied voxel. For example, the volume measure for an occupied voxel can be a radius that indicates the volume of a sphere that has the radius and is centered on the occupied voxel. The volume measures for the occupied voxels are non-uniform in that they are not all the same volume measure. For example, one or more first occupied voxels can have a volume measure that is a radius of 10 cm, one or more second occupied voxels can have a volume measure that is a radius of 4 cm, one or more third occupied voxels can have a volume measure that is a radius of 3 mm, etc.

In some implementations, the volume measure for a given occupied voxel can be generated based on a position of the given occupied voxel as compared to: a current position of a reference point of the robot, a target position of the reference point of the robot, and/or position(s) of one or more "links" of the robot. A reference point of the robot can be, for example, a reference point of an end effector of the robot (e.g., an "action point" of the end effector, a center of mass of the end effector), or other reference point of the robot that is not relative to any end effector of the robot (e.g., a center of mass of the robot as a whole). A link of the robot references a structural component of the robot.

In some implementations, the volume measure for an occupied voxel is determined based on the smaller of: (1) a current distance that is the distance between the occupied voxel and the current position reference point of the robot; and (2) a target distance that is the distance between the occupied voxel and the target position reference point of the robot. In some of those implementations, an initial volume measure is determined based on the smaller of the current distance and the target distance. As one example, the initial volume measure can be: 15 cm if the smaller of the two distances is greater than or equal to 20 cm; 8 cm if the smaller of the two distances is less than 20 cm, but greater than or equal to 12 cm; 4 cm if the smaller of the two distances is less than 12 cm, but greater than or equal to 8 cm; etc. Additional and/or alternative ranges, values, and/or techniques (e.g., an equation-based technique) may be utilized to determine an initial volume measure based on the smaller of the current distance and the target distance.

In some versions of the implementations that determine an initial volume measure for an occupied voxel, the occupied voxel with the initial volume measure is then "checked" to determine if it collides with, and/or is within a threshold distance of, one or more links of the robot. If not, the initial volume measure can be used as the volume measure for the occupied voxel. If so, the initial volume measure can be reduced and the occupied voxel with the reduced volume measure can then be checked to determine if it is in collision with, and/or within the threshold distance of, the one or more links of the robot. If the occupied voxel with the reduced volume measure no longer collides with and/or is no longer within a threshold distance of link(s) of the robot, the reduced volume measure can be used as the volume measure for the occupied voxel. On the other hand, if the occupied voxel with the reduced volume measure still collides with and/or is within a threshold distance of link(s) of the robot, the reduced volume measure can optionally be further reduced. The occupied voxel with the further reduced volume measure can then be checked to determine if it is in collision with, and/or within the threshold distance of, the one or more links of the robot. Multiple iterations of this may optionally be performed. For example, multiple iterations may be performed until a minimum volume measure is reached and/or until other criterion/criteria are satisfied. If the occupied voxel with all checked reduced volume measures all collide with and/or are within a threshold distance of link(s) of the robot, the occupied voxel can be assumed to be part of the robot—and that occupied voxel optionally discarded and/or not considered as an obstacle in path planning and/or for other robotic operations.

Various techniques described herein can be utilized to cause relatively large volume measures to be defined for occupied voxels that correspond to objects that are relatively far away from: a current position of a robot, a target position of the robot, and/or links of the robot. Moreover, those various techniques can be utilized to cause relatively small volume measures to be defined for occupied voxels that correspond to objects that are relatively close to: a current position of a robot, a target position of the robot, and/or links of the robot. During path planning, the volume measures of the occupied voxels can be considered as "paddings" for the occupied voxels and the occupied voxels with their corresponding volume measures considered as obstacles. Accordingly, an object that is relatively "far away" can be represented by occupied voxel(s) each having a corresponding volume measure that is relatively large (e.g., that extends well beyond actual space occupied by the object). On the other hand, an object that is relatively "close" can be represented by occupied voxel(s) each having a corresponding volume measure that is relatively small (e.g., that does not extend beyond the actual space occupied by the object, or only slightly beyond).

In this manner, during path planning (or other robotic applications), relatively large areas around relatively far away objects can be considered as "occupied". This may improve computational efficiency of the path planning relative to one or more prior techniques. For example, for exploratory path planning techniques (e.g., randomized path planning algorithms), having relatively large areas considered as occupied may reduce a path search space. Reducing the path search space may lead to faster resolution of a path. Moreover, simultaneously having relatively smaller volumes for occupied voxels that correspond to relatively close objects may still enable generation of an achievable path that is efficient (according to one or more parameters such as shortest path, quickest path) and/or that reaches the target position. Additionally, as described herein, some implementations may omit some voxels and corresponding volume measures from being considered during path planning, which may also improve the computational efficiency of the path planning. For example, some implementations may omit one or more voxels and corresponding volume measures based on the corresponding volume measures satisfying a threshold.

In some implementations, a method may be provided that includes: receiving data points generated by a three-dimensional (3D) vision component viewing an environment of a robot, and generating a 3D voxel model based on the data points. The 3D voxel model includes occupied voxels that are occupied based on the received data points. The method further includes generating a volume measure for each of the occupied voxels. The generated volume measures include a plurality of volume measures that are each non-uniform relative to other volume measures. Generating the volume measure for each of the occupied voxels includes: generating the volume measure for the occupied voxel based on a distance between the occupied voxel and at least one of: a current position of a reference point of the robot, and a target position of the reference point of the robot. The method further includes: generating a path from the current position to the target position based on a group of the occupied voxels and the volume measures of the group of the occupied voxels; and generating control commands to provide to actuators of the robot to effectuate the path.

This method and other implementations of technology disclosed herein may each optionally include one or more of the following features.

In some implementations, generating the volume measure for a given occupied voxel of the occupied voxels is further based on a geometric model of the robot in a current configuration of the robot, where the current configuration causes the reference point to be in the current position. In some of those implementations, generating the volume measure for the given occupied voxel includes: generating an initial volume measure for the given occupied voxel based on distance between the given occupied voxel and the at least one of the current position and the target position; and generating the volume measure for the given occupied voxel by modifying the initial volume measure based on the geometric model. In some versions of those implementations, generating the initial volume measure for the given occupied voxel based on the distance between the given occupied voxel and the at least one of the current position and the target position includes generating the initial volume measure based on a smaller of: a current distance between the given occupied voxel and the current position, and a target distance between the given occupied voxel and the target position. Further, in some versions of those implementations, modifying the initial volume measure based on the geometric model includes: reducing the initial volume measure in response to determining that the given occupied voxel with the initial volume measure collides with the geometric model or is within a threshold distance of the geometric model.

In some implementations, generating the volume measure for a given occupied voxel of the occupied voxels is further based on a geometric model of the robot in a current configuration of the robot, and the geometric model of the robot includes a plurality of bounding volumes. Each of the bounding volumes represents at least one corresponding link of the robot in the current configuration of the robot. In some of those implementations, each of the bounding volumes is a bounding box.

In some implementations, the volume measures each define a corresponding radius. In some of those implementations, generating the path based on the occupied voxels and the volume measures of the group of the occupied voxels includes generating the path based on a plurality of spheres each defined by a corresponding one of the occupied voxels and its radius.

In some implementations, the group of the occupied voxels based on which the path is generated is a subgroup of the occupied voxels of the 3D voxel model. In some of those implementations, the method further includes: generating the subgroup of the occupied voxels by omitting at least some of the occupied voxels of the 3D voxel model. In some versions of those implementations, omitting at least one of the occupied voxels can be based on the volume measure of that occupied voxel being larger than a threshold and/or omitting at least one of the occupied voxels can be based on determining that occupied voxel represents a component of the robot. In some implementations, determining that that a given occupied voxel represents a component of the robot includes: generating an initial volume measure for the given occupied voxel based on distance between the given occupied voxel and the at least one of the current position and the target position; generating one or more smaller volume measures for the given occupied voxel; and determining that the given occupied voxel represents a component of the robot in response to determining that the given occupied voxel with the initial volume measure collides with the robot in a current configuration of the robot and that the given occupied voxel with any of the smaller volume measures collides with the robot in the current configuration.

Other implementations may include a non-transitory computer readable storage medium storing instructions executable by a processor to perform a method such as one or more of the methods described above. Yet another implementation may include a system (e.g., a robot, a robot control system, and/or one or more other components) including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
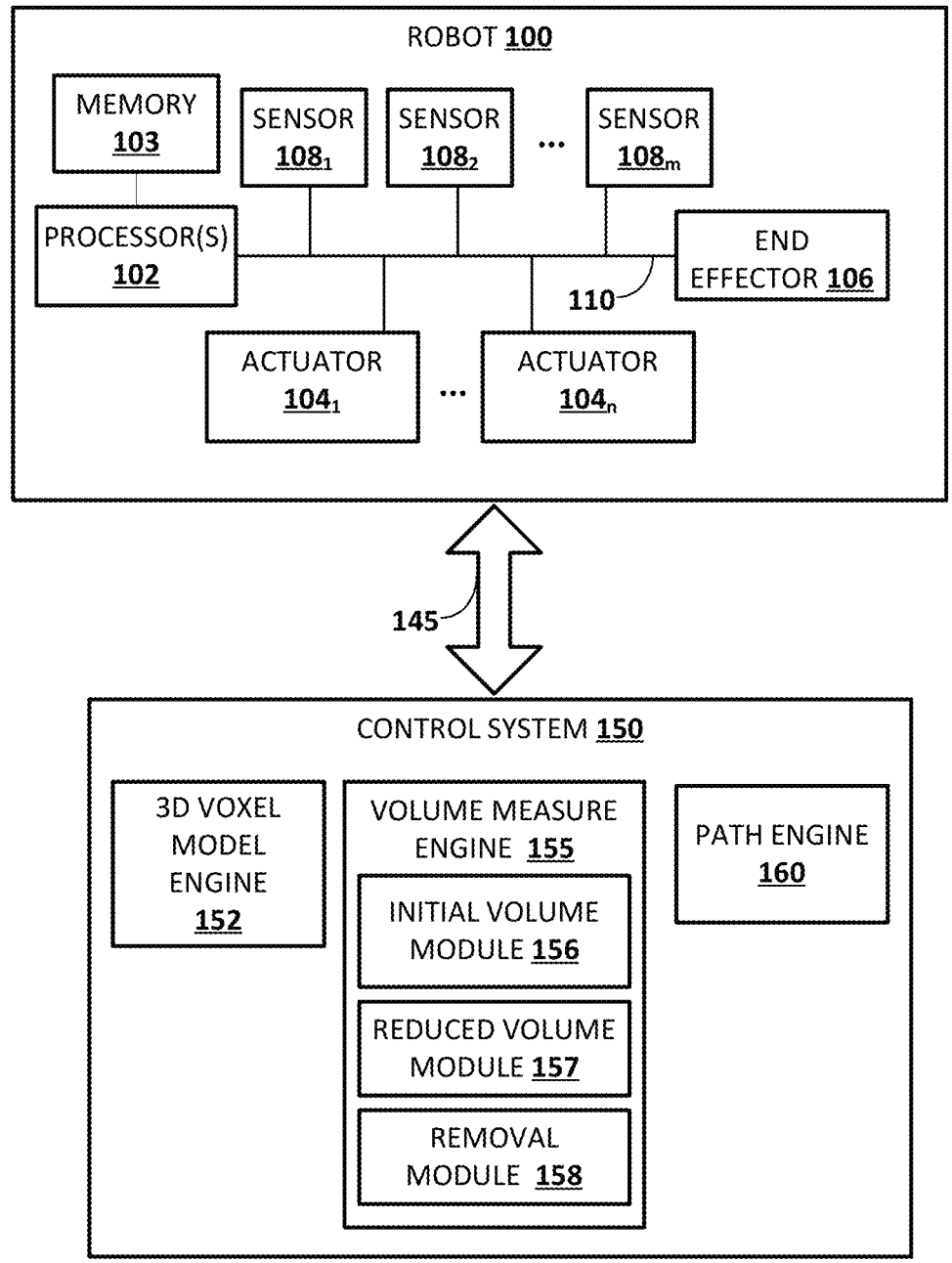
FIG. 1 illustrates an example environment in which implementations disclosed herein may be implemented.

Implementations disclosed herein are related to generating and utilizing non-uniform volume measures for occupied voxels, where each of the occupied voxels represents an occupied point of an environment of a robot. As one particular example, assume a 3D point cloud is generated by a 3D vision component of a robot. One or more processors (e.g., of the robot) can generate a 3D voxel model based on the 3D point cloud. For example, voxels of the 3D voxel model can be indicated as "occupied" based on those voxels corresponding to data points of the 3D point cloud. One or more of the processors may optionally initially filter out one or more voxels of the 3D voxel model based on one or more criteria. For example, voxels that are beyond a workspace of the robot may be removed.

One or more of the processors can then generate a volume measure for each of the occupied voxels of the 3D voxel model. The volume measure for each of the occupied voxels can be generated based on a position of the occupied voxel as compared to: a current position of a reference point of the robot, a target position of the reference point of the robot, and/or position(s) of one or more "links" of the robot. As the volume measure for each of the occupied voxels is dependent on its position relative to position(s) of the robot, non-uniform volume measures are generated. In other words, the volume measures are not all the same. For example, one or more first occupied voxels can have a volume measure that is a radius of 5 cm, one or more second occupied voxels can have a volume measure that is a radius of 3 cm, one or more third occupied voxels can have a volume measure that is a radius of 1 cm, etc.

One or more of the processors can then utilize a group of the occupied voxels and their corresponding volume measures for path planning and/or other robotic application. For example, the volume measures can each indicate the volume of a sphere (e.g., be a radius), and their corresponding occupied voxel can indicate the center of the sphere. One or more of the processors can generate a path, from a current position of the robot to a target position of the robot, while considering the spheres as obstacles. For example, the path can be generated using an exploratory path planning technique that explores potential paths through areas that are not indicated by the spheres as occupied. For instance, a Rapidly-exploring Random Tree (RRT) algorithm may be utilized to generate the path, such as RRT-Connect.

As described herein, in generating volume measures for occupied voxels, implementations can generate relatively large volume measures for occupied voxels that correspond to objects that are relatively far away from: a current position of a robot, a target position of the robot, and/or links of the robot. On the other hand, in generating volume measures for occupied voxels, implementations can generate relatively small volume measures for occupied voxels that correspond to objects that are relatively close to: a current position of a robot, a target position of the robot, and/or links of the robot. Accordingly, an object that is relatively "far away" can be represented by occupied voxel(s) each having a corresponding volume measure that is relatively large. On the other hand, an object that is relatively "close" can be represented by occupied voxel(s) each having a corresponding volume measure that is relatively small. In this manner, during path planning relatively far away objects can each be represented by relatively large volume shape(s) (e.g., sphere(s)), while relatively close objects can each be represented by relatively low volume shape(s) (e.g., spheres).

This may provide various technical advantages. For example, utilizing relatively large volume shapes to represent relatively far away objects can lead to faster resolution of a path. Also, for example, utilizing relatively smaller volume shapes to represent relatively close objects may still enable generation of an achievable path that is efficient and/or that reaches the target position (e.g., that doesn't avoid the target position due to over-padding near the target position). Additionally, as described herein, some implementations may omit some voxels and corresponding volume measures from being considered during path planning, which may also improve the computational efficiency of the path planning.

Turning now to the figures, these and other implementations are described in more detail. FIG. 1 illustrates an example environment in which implementations disclosed herein may be implemented. A robot 100 is illustrated in FIG. 1. Robot 100 may take various forms, including but not limited to a telepresence robot, a robot arm, a humanoid, an animal, an insect, an aquatic creature, a wheeled device, a submersible vehicle, a unmanned aerial vehicle ("UAV"), and so forth. In various implementations, robot 100 may include one or more processors 102. Processor(s) 102 may take various forms, such as one or more CPUs, one or more GPUs, one or more field-programmable gate arrays ("FPGA"), and/or one or more application-specific integrated circuits ("ASIC"). In some implementations, the processor(s) 102 may be operably coupled with memory 103. Memory 103 may take various forms, such as random access memory ("RAM"), dynamic RAM ("DRAM"), read-only memory ("ROM"), Magnetoresistive RAM ("MRAM"), resistive RAM ("RRAM"), NAND flash memory, and so forth.

In some implementations, processor(s) 102 may be operably coupled with one or more actuators $104_{1-n}$, one or more end effectors 106, and/or one or more sensors $108_{1-m}$, e.g., via one or more buses 110. The robot 100 may have multiple degrees of freedom and each of the actuators may control actuation of the robot 100 within one or more of the degrees of freedom responsive to control commands. The control commands are generated by one or more of the processor(s) 102 and provided to the actuators (e.g., via one or more of the buses 110) to control the robot 100. As used herein, "actuator" encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

As used herein, "end effector" may refer to a variety of tools that may be operated by robot 100 in order to accomplish various tasks. For example, some robots may be equipped with an end effector 106 that takes the form of a claw with two opposing "fingers" or "digits." Such a claw is one type of "gripper" known as an "impactive" gripper. Other types of grippers may include but are not limited to "ingressive" (e.g., physically penetrating an object using pins, needles, etc.), "astrictive" (e.g., using suction or vacuum to pick up an object), or "contiguitive" (e.g., using surface tension, freezing or adhesive to pick up object). More generally, other types of end effectors may include but are not limited to drills, brushes, force-torque sensors, cutting tools, deburring tools, welding torches, containers, trays, and so forth. In some implementations, end effector 106 may be removable, and various types of modular end effectors may be installed onto robot 100, depending on the circumstances. Some robots, such as some telepresence robots, may not be equipped with end effectors. Instead, some telepresence robots may include displays to render visual representations of the users controlling the telepresence robots, as well as speakers and/or microphones that facilitate the telepresence robot "acting" like the user.

Sensors 108 may take various forms, including but not limited to 3D vision components (e.g., 3D laser scanners, stereographic cameras), two-dimensional cameras, light sensors (e.g., passive infrared), force sensors, pressure sensors, pressure wave sensors (e.g., microphones), proximity sensors (also referred to as "distance sensors"), torque sensors, bar code readers, radio frequency identification ("RFID") readers, radars, range finders, accelerometers, gyroscopes, compasses, position sensors (e.g., odometer, a global positioning system), speedometers, edge detectors, and so forth. While sensors $108_{1-m}$ are depicted as being integral with robot 100, this is not meant to be limiting. In some implementations, sensors 108 may be located external to, but may be in direct or indirect communication with, robot 100.

Control system 150 is also illustrated in FIG. 1 and includes a 3D voxel model engine 152, a volume measure engine 155, and a path engine 160. Although the control system 150 is illustrated separate from the robot 100 in FIG. 1, connection arrow 145 indicates that the control system 150 can be implemented on robot 100 and/or can be in network communication (e.g., via a local area network and/or a wide area network) with robot 100. For example, in some implementations, one or more (e.g., all) of the engines of the control system 150 are implemented by hardware that is local to the robot 100, such as one or more of the processors 102. Such processor(s) that implement one or more of the engines may optionally be separate from the processor(s) that generate and/or provide control commands to actuators 104 of the robot 100. For example, the control system 150 may be implemented by one or more processors that do not operate in a real-time domain of the robot 100, whereas other processor(s) that do operate in the real-time domain generate and provide control commands to actuators 140. In some implementations, one or more (e.g., all) of the engines of the control system 150 are implemented by hardware that is separate from the robot 100. For example, engine(s) may be implemented "in the cloud" by a remote cluster of high performance computing devices and/or by one or more computing devices that are separate from the robot 100, but that are geographically proximal to the robot (e.g., in the same building). In implementations where robot 100 and one or more aspects of control system 150 are separate, they may communicate over one or more wired or wireless networks (not depicted) or using other wireless technology, such as radio, Bluetooth, infrared, etc.

The 3D voxel model engine 152 receives data points sensed by a 3D vision component of the sensors 108, and generates a 3D voxel model based on the data points. For example, the data points can be a 3D point cloud and the 3D voxel model engine 152 can project the data points onto spatially-corresponding voxels of the 3D voxel model, and indicate the corresponding voxels as occupied. In other words, it can generate the 3D voxel model by indicating voxels as occupied based on those voxels corresponding to 3D positions that are indicated as occupied by a corresponding 3D vision component generated data point. In some implementations, the 3D voxel model engine 152 may remove some voxels from the 3D voxel model, such as voxels that are beyond a workspace of the robot.

Figure 2:
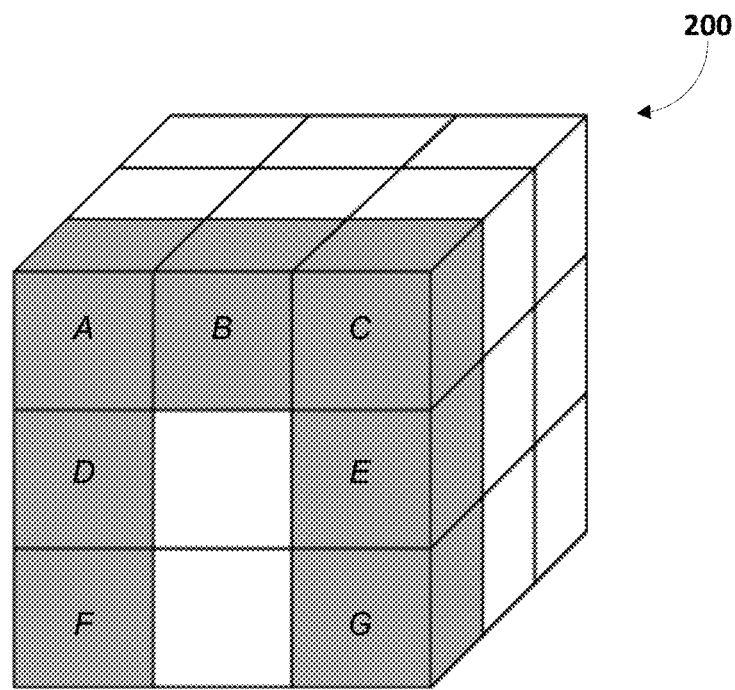
FIG. 2 illustrates an example of a portion of a 3D voxel model.

FIG. 2 illustrates a portion 200 of an example 3D voxel model. For purposes of explanation, the portion 200 of the model consists of a simple cubic structure divided into twenty seven voxels. However, it should be understood that in real world 3D voxel models, the modeled environment would not necessarily (or even likely) be cubic, and that far more than twenty seven voxels would realistically be used to represent the environment. In this example, seven voxels labeled A-G are pigmented to indicate that they have been deemed to be "occupied" voxels. It is understood that the occupied voxels of FIG. 2 are illustrated without associated padding/volume measures. As described herein, such volume measures can be generated for occupied voxels to "pad" such voxels—causing them to effectively be represented by volumes that are centered on the voxels, and such volumes utilized by path engine 160 and/or other engines.

Volume measure engine 155 generates volume measures for each of the occupied voxels of a 3D voxel model generated by the 3D voxel model engine 152. The volume measure for each of the occupied voxels is a "padding" for the occupied voxel and indicates a volume to be utilized for that occupied voxel. For example, the volume measure for an occupied voxel can be a radius that indicates the volume of a sphere that has the radius and is centered on the occupied voxel. Other volume measures can be utilized, such as volume measures that indicate the volume of a cube that is centered on the occupied voxel, and/or other volume measures that indicate the volume of other 3D shape(s).

As described herein, the volume measure engine 155 generates non-uniform volume measures for occupied voxels of various 3D voxel models. The volume measures for the occupied voxels are non-uniform in that they are not all the same volume measure. Volume measure engine 155 can include an initial volume module 156, a reduced volume module 157, and a removal module 158.

In some implementations, for each considered occupied voxel, the initial volume module 156 generates an initial volume measure. In some of those implementations, the initial volume module 156 generates the initial volume measure based on a position of the occupied voxel as compared to: a current position of a reference point of the robot and/or a target position of the reference point of the robot. In some versions of those implementations, the module 156 determines (1) a current distance that is the distance between the occupied voxel and the current position reference point of the robot; and (2) a target distance that is the distance between the occupied voxel and the target position of the reference point of the robot. For example, the position of the occupied voxel may be expressed in three dimensions (X,Y,Z), and the current position and the target position may each be expressed in three dimensions. The current distance can be determined as the absolute value of the 3D distance between the position of the occupied voxel and the current position, and the target distance can each be determined as the absolute value of the 3D distance between the position of the occupied voxel and the target position.

In some implementations, the initial volume module 156 determines the initial volume measure based on the smaller of the current distance and the target distance. For example, the initial volume module 156 can access an index (e.g., in a computer readable media) that includes initial volumes mapped to distances and/or distance ranges. The initial volume module 156 can then search the index and select the initial volume that maps to the determined smaller of the distances. As another example, the initial volume module 156 can determine the initial volume measure by applying the smaller of the two distances to a function that maps distances to initial volumes. In some other implementations, the initial volume module 156 determines the initial volume measure based on the both the current distance and the target distance.

The target position of the reference point utilized by the volume measure engine 155 can be obtained from various sources. For example, the target position can be a user inputted target position (e.g., the user using one or more user interface input devices of a computing device to define the target position), a stored target position retrieved from memory (e.g., a stored target position for a task being performed by the robot 100), or a target position automatically determined by one or more components of the robot 100 (e.g., a target position determined to reach an object).

In some implementations, for each initial volume measure generated by the initial volume module 156, the reduced volume module 157 determines if the occupied voxel with the initial volume collides with, and/or is within a threshold distance of, one or more links of the robot. If not, the initial volume measure can be used as the volume measure for the occupied voxel. If so, reduced volume module 157 can reduce the initial volume measure and determine if the occupied voxel with the reduced volume measure collides with, and/or is within a threshold distance of, one or more links of the robot. If the occupied voxel with the reduced volume measure no longer collides with and/or is no longer within a threshold distance of link(s) of the robot, the reduced volume module 157 can assign the reduced volume measure to the occupied voxel. On the other hand, if the occupied voxel with the reduced volume measure still collides with and/or is within a threshold distance of link(s) of the robot, the reduced volume module 157 can further reduce the reduced volume measure. The reduced volume module 157 can then determine if the occupied voxel with the further reduced volume measure collides with, and/or is within a threshold distance of, one or more links of the robot. The reduced volume module 157 can perform multiple iterations of this, e.g., until a minimum volume measure is reached and/or until other criterion/criteria are satisfied. If the reduced volume module 157 determines the occupied voxel with all checked reduced volume measures all collide with and/or are within a threshold distance of link(s) of the robot, the occupied voxel can be assumed to be part of the robot—and that occupied voxel optionally discarded the reduced volume module 157 and/or not considered as an obstacle in path planning and/or for other robotic applications.

In some implementations, in determining whether a given occupied voxel with a given volume conflicts with one or more links of the robot, a geometric model of links of the robot is utilized. For example, a geometric model may include one or ore more bounded volumes that each contain one or more links of the robot. For instance, the one or more bounded volumes may include spheres, cubes, cuboids, cylinders, cones, and so forth. The positions of the bounded volumes can be determined based on the current configuration of the robot 100 (e.g., based on position sensor readings and a dynamic model of the robot 100). The reduced volume module 157 can then determine if the given occupied voxel with the given volume collides with and/or is within a threshold distance of the bounded volumes of the geometric model. For example, assume the geometric model is a plurality of cuboids, and the given occupied voxel with the given volume defines a sphere. The reduced volume module 157 can determine if the sphere intersects any of the cuboids and if so, determine that there is a collision.

Removal module 158 can remove one or more of the occupied voxels based on determined volume measures for those occupied voxels. For example, removal module 158 can remove one or more occupied voxels that have at least a threshold volume measure. For instance, the removal module 158 can randomly remove 40% of the occupied voxels with volume measures greater than X. Removing such occupied voxels may improve computational efficiency of path planning or other robotic application(s), while still enabling generation of a path that avoids obstacles. This can be due to the large padding/volume measures that are utilized for occupied voxels, since some occupied voxels with those large volume measures will likely still remain after a random removal—and since they are "oversized" they likely still encompass the corresponding object and will prevent planning of a path that collides with the object.

Path engine 160 utilizes the occupied voxels and their corresponding volume measures determined by volume measure engine 155 to generate a path from the current position of the robot 100 to a target position of the robot 100. For example, the volume measures can each indicate the volume of a sphere (e.g., be a radius), and their corresponding occupied voxel can indicate the center of the sphere. The path engine 160 can generate a path, from a current position of the robot to a target position of the robot, while considering the spheres as obstacles. For example, the path engine 160 can generate the path using an exploratory path planning technique that explores potential paths through areas that are not indicated by the spheres as occupied. For instance, a Rapidly-exploring Random Tree (RRT) algorithm may be utilized to generate the path, such as RRT-Connect.

Figure 3A:
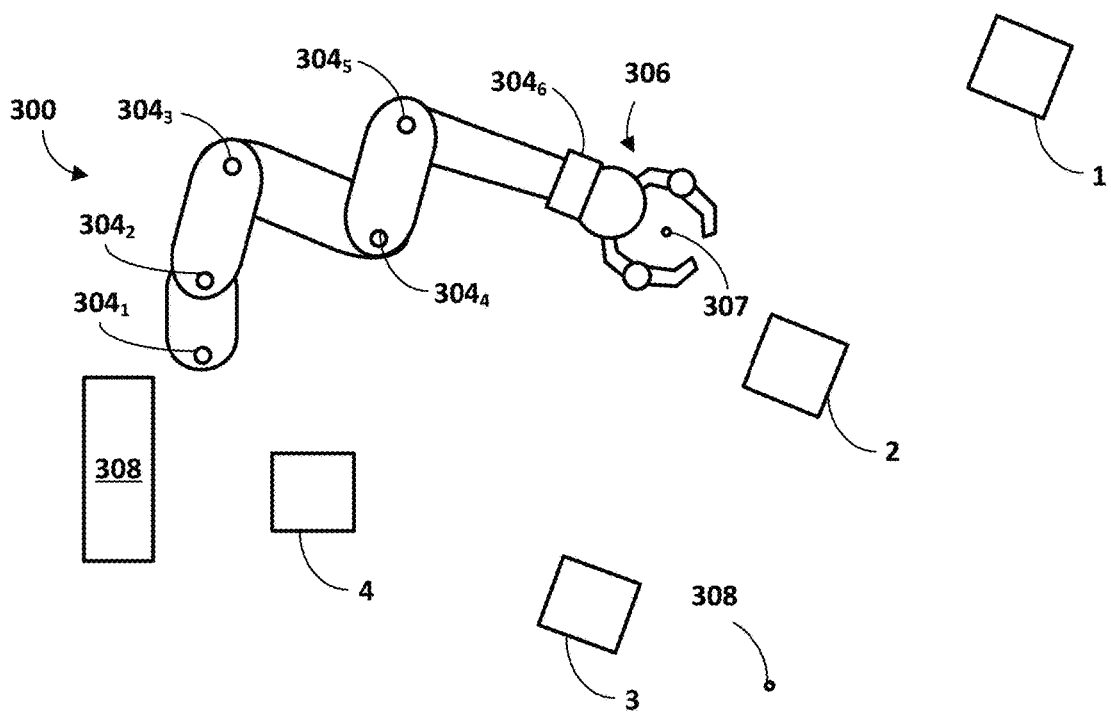
FIG. 3A illustrates an example robot, an example 3D vision component, and example objects that may be present in an environment of the robot.

Turning now to FIGS. 3A-3F, additional description is provided of various implementations. In FIG. 3A, an example robot 300 is illustrated in a current configuration. The robot 300 is one example of robot 100 of FIG. 1. Robot 300 is in a "robot arm" form and may include components that are in addition to those illustrated in FIG. 3A. For example, the robot 300 may further include a base that supports the robot arm, such as a stationary base and/or a mobile base (e.g., that includes wheels). The robot 300 includes a plurality of actuators $304_1$-$304_6$ and an end effector 306 in the form of a gripper claw. A current position 307 of a reference point of the robot 300 in the current configuration is also illustrated, where the reference point is a reference point defined relative to the end effector 306 (i.e., at an "action point" of the end effector 306).

Also illustrated in FIG. 3A is a target position 308 of the reference point of the robot 300. The target position 308 can be, for example, a user inputted target position, a stored target position retrieved from memory, or a target position determined by one or more components of the robot 300.

Also illustrated in FIG. 3A is a 3D vision component 308 of the robot 300, that has a field of view of at least a portion of the environment of the robot 300. The 3D vision component 308 can be, for example a 3D laser scanner or a stereographic camera. The 3D vision component 308 captures data points (e.g., a 3D point cloud) that capture visible (to the 3D vision component 308) surfaces in the environment of the robot (e.g., visible surfaces of objects 1, 2, 3, and 4). The objects 1, 2, 3, and 4 are all the same dimensions, but are at different positions in the environment. The 3D vision component 308 is illustrated in FIG. 3A as separate from the robot 300 for simplicity, but it is understood that it may be incorporated as part of the robot 300 (e.g., coupled to an unillustrated "base" of the robot 300).

It is noted that the components of FIG. 3A are three-dimensional components, even though they are represented two-dimensionally in FIG. 3A for the sake of simplicity. For example, objects 1, 2, 3, and 4 are each 3D components. Also, it is noted that the positions of the various components may vary in the dimension that is "into" and "out of" FIG. 2A. For example, in addition to object 1 and object 2 varying positionally in the dimensions of FIG. 3A, they may also vary positionally in a dimension that is "into" and "out of" FIG. 2A.

Figure 3B:
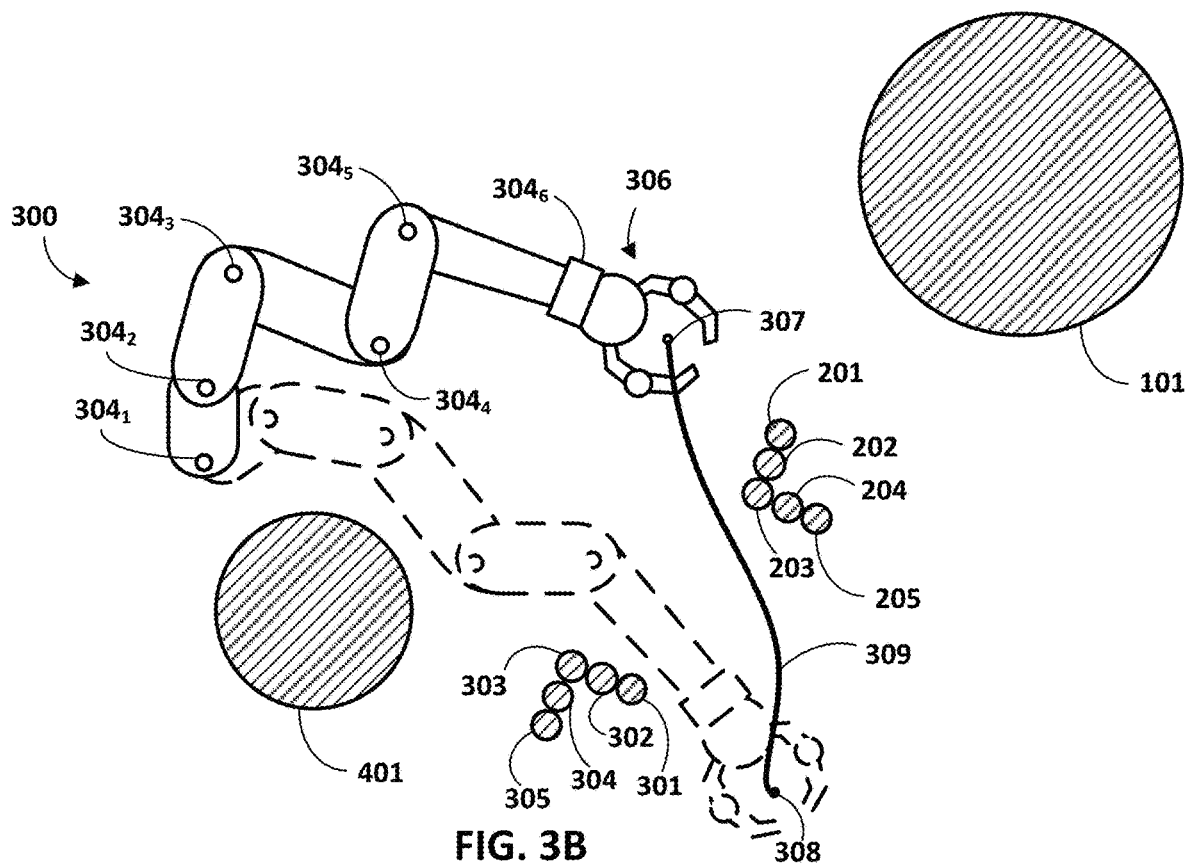
FIG. 3B illustrates the example robot of FIG. 3A, and examples of spheres that may be generated according to implementations disclosed herein. The spheres are each based on a corresponding voxel and corresponding volume measure. An example path that can be generated based on the spheres (and additional unillustrated spheres) is also illustrated.

FIG. 3B illustrates the robot 300 of FIG. 3A, and examples of spheres 101, 201-205, 301-305, and 401 that may be generated according to implementations disclosed herein. The spheres 101, 201-205, 301-305, and 401 are each based on a corresponding voxel and corresponding volume measure that can be generated according to implementations disclosed herein. It is noted that the spheres 101, 201-205, 301-305, and 401 are 3D spheres, even though they are represented two-dimensionally in FIG. 3B for the sake of simplicity. An example path 309 that can be generated based on the spheres 101, 201-205, 301-305, and 401 (and additional unillustrated spheres) is also illustrated.

Sphere 101 corresponds to an occupied voxel (corresponding to the center of the sphere 101) that corresponds to a data point that captures object 1 (FIG. 3A), and that has a corresponding volume measure that is the radius of the sphere 101. As can be seen, sphere 101 has the largest volume measure of the depicted spheres. This can be due to an occupied voxel of the sphere 101 being relatively far away from the current position 307, the target position 308, and the links of the robot 300. For example, the radius of the sphere 101 can be initially determined based on the distance of the occupied voxel of the sphere 101 to the current position 307 (since that distance is smaller than the distance of the occupied voxel to the target position 308). Further, the sphere 101 can be checked to see if interferes with (i.e., collides with and/or is within a threshold distance of) bounding boxes and/or other geometric models of the current configuration (indicated in solid lines) of the robot 300 and, since it does not, that initially determined radius utilized.

Spheres 201-205 each correspond to a corresponding occupied voxel, that in turn corresponds to a corresponding data point that captures object 2 (FIG. 3A). Each of the occupied voxels represented by spheres 201-205 has a volume measure that is the radius of its corresponding sphere 201-205. As can be seen, spheres 201-205 all have the same volume measure, and the volume measure of the spheres 201-205 is much smaller than the volume measure of sphere 101. This can be due to the occupied voxels of each of the spheres 201-205 being relatively close to the current position 307. For example, the radius of the sphere 201 can be initially determined based on the distance of the occupied voxel of the sphere 201 to the current position 307 (since that distance is smaller than the distance of the occupied voxel to the target position 308). Further, the sphere 201 can be checked to see if interferes with bounding boxes and/or other geometric models of the current configuration (indicated in solid lines) of the robot 300 and, since it does not, that initially determined radius utilized.

Spheres 301-305 each correspond to a corresponding occupied voxel, that in turn corresponds to a corresponding data point that captures object 3 (FIG. 3A). Each of the occupied voxels represented by spheres 301-305 has a volume measure that is the radius of its corresponding sphere 301-305. As can be seen, spheres 301-305 all have the same volume measure, and the volume measure of the spheres 301-305 is the same as that of the spheres 201-205. This can be due to the occupied voxels of each of the spheres 301-305 being relatively close to the target position 308. For example, the radius of the sphere 301 can be initially determined based on the distance of the occupied voxel of the sphere 301 to the target position 308 (since that distance is smaller than the distance of the occupied voxel to the current position 307). Further, the sphere 301 can be checked to see if interferes with bounding boxes and/or other geometric models of the current configuration (indicated in solid lines) of the robot 300 and, since it does not, that initially determined radius utilized.

Sphere 401 indicates an occupied voxel (corresponding to the center of the sphere 401) that corresponds to a data point that captures object 4 (FIG. 3A), and that has a corresponding volume measure that is the radius of the sphere 401. As can be seen, sphere 401 has a volume measure that is between that of sphere 101, and that of spheres 201-205 and 301-305. This can be due to an occupied voxel of the sphere 401 being relatively far away from the current position 307 and the target position 308, but relatively close to one of the links of the robot 300.

Figure 3C:
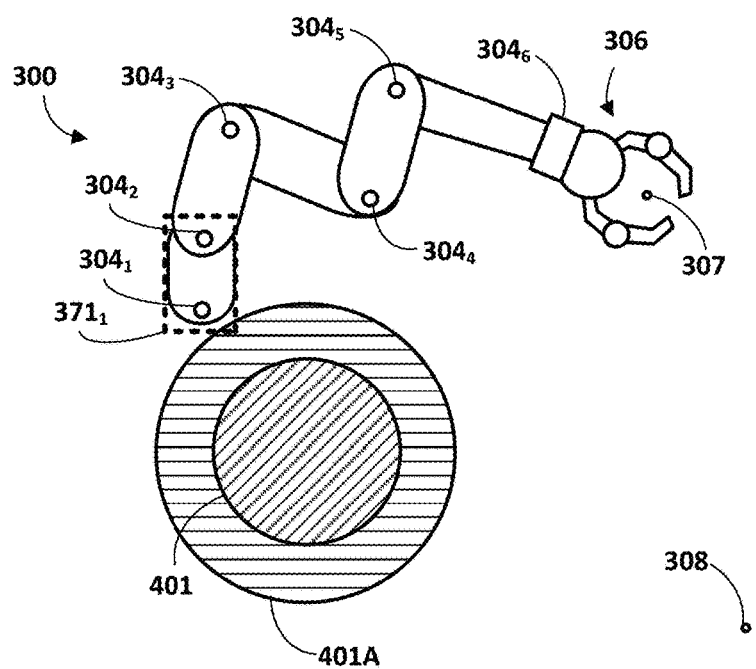
FIG. 3C illustrates the example robot of FIG. 3A, an example of an initial volume for an occupied voxel that collides with a geometric model of the example robot, and an example of a reduced volume for the occupied voxel that does not collide with the geometric model of the robot.

For example, with reference to FIG. 3C an initial radius indicated by sphere 401A (that is the same size as sphere 101) can be initially determined based on the distance of the occupied voxel of the sphere 401 to the current position 307 (since that distance is smaller than the distance to the target position 308). Further, the initially determined radius can be checked to see if interferes with bounding boxes and/or other geometric models of the current configuration (solid lines) of the robot 300. For example, it can be determined whether the sphere 401A collides with any bounding boxes that represent the links, such as bounding box $371_1$ of FIG. 3C. Since it does (see FIG. 3C), the initially determined radius can be reduced to that indicated by sphere 401 of FIG. 3C. The sphere 401 can also be checked for interference with bounding boxes and/or other geometric models of the current configuration of the robot 300. For example, it can be determined whether the sphere 401 collides with any bounding boxes that represent the links and, since it does not, that reduced radius can be utilized. It is noted that multiple iterations of "reducing" and "checking" may be performed.

The spheres 101, 201-205, 301-305, and 401 of FIG. 3B can be provided to path engine 160, and the path engine 160 can utilize those as indications of obstacles in generating a path that avoids obstacles, such as example path 309 of FIG. 3B. It is noted that the example path 309 may be a 3D path, even though it is illustrated in FIG. 3B as two-dimensional for simplicity. Commands engine 162 can generate control commands to provide to actuators $304_{1-6}$ to effectuate the path 309. For example, the control commands can cause the robot 300 to move from the current configuration (solid lines) to a target configuration (broken lines) in which the reference point of the robot 300 is at the target position 308.

It is noted that the target configuration (broken lines) of the robot 300 in FIG. 3B is presented as just one example. Due to kinematic redundancy of the robot 300, there are multiple additional target configurations in which the reference point of the end effector 306 can also be positioned at the target position 308. Further, it is noted that in many implementations a target configuration for the target position 308 is not determined until after generation of the path 309. For example, the path 309 may be generated, then control commands generated in real-time to effectuate the path and cause the robot to traverse through a plurality of intermediary configurations before reaching the target configuration.

It is also noted that although the objects 1, 2, 3, and 4 are all the same size (as illustrated in FIG. 3A), the spheres utilized to represent those objects have non-uniform volumes (as illustrated in FIG. 3B). Again, this is based on the varying positions of occupied voxels corresponding to those objects and, in particular, the varying positions relative to the current position 307, target position 308, and/or a geometric model of the robot 300. As described above, this may improve computational efficiency of the path planning relative to prior techniques.

Figure 3D:
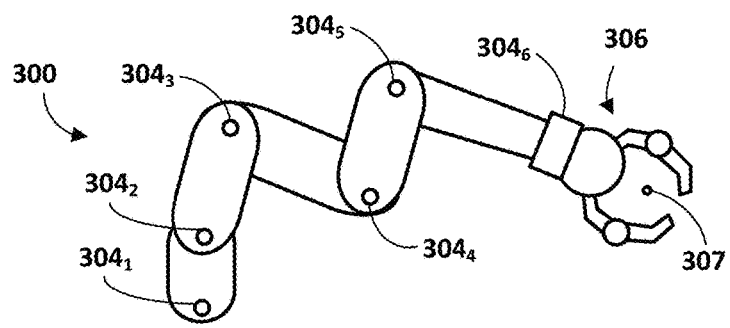
FIG. 3D illustrates the example robot of FIG. 3A, and an example of multiple spheres that may be generated based on occupied voxels that all correspond to one of the objects of FIG. 3A.

Although FIG. 3B illustrates some spheres, additional spheres may be generated based on additional occupied voxels and optionally provided to and/or utilized by the path engine 160. For example, FIG. 3D illustrates how additional spheres 105 and 106 may be generated based on additional occupied voxels that correspond to object 1. For example: sphere 101 may have a center that corresponds to a first voxel that is occupied based on a first data point that captures object 1; sphere 105 may have a center that corresponds to a second voxel that is occupied based on a second data point that captures object 1; and sphere 106 may have a center that corresponds to a third voxel that is occupied based on a third data point that captures object 1. In some implementations, these (and optionally additional) spheres may also be provided to the path engine 160.

In some implementations, one or more of the spheres 101, 105, and/or 106 (and/or additional spheres) may be removed and a subgroup of spheres provided to the path planner. For example, one or more spheres such as sphere 105, sphere 106 and/or other spheres having at least a threshold volume measure may be removed (e.g., X % of spheres of greater than Y radius may be "randomly" removed), under the assumption that other "large" spheres that capture the same object may still remain—and since they are "oversized" they likely still encompass the object and will prevent planning of a path that collides with the object. Removing one or more spheres may improve computational efficiency of path planning as described herein.

Figure 3E:
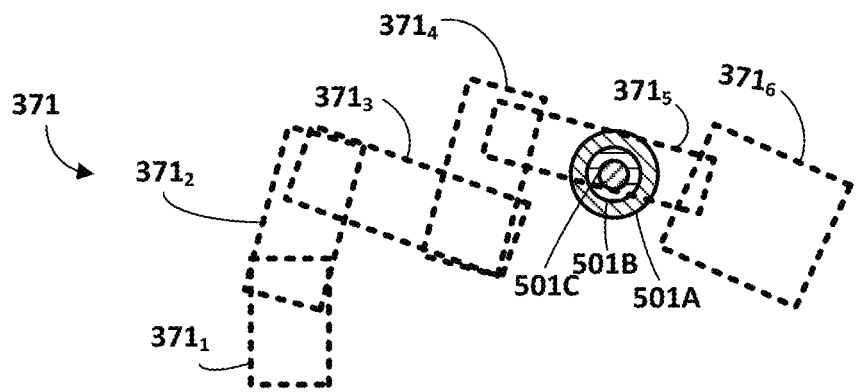
FIG. 3E illustrates an example geometric model of the example robot of FIG. 3A, and an example of determining that an occupied voxel corresponds to the example robot.

FIG. 3E illustrates an example geometric model 371 of the robot 300 of FIG. 3A, and an example of determining that an occupied voxel corresponds to the example robot. In FIG. 3E, the geometric model 371 includes a plurality of bounding boxes $371_1$-$371_6$. Each of the bounding boxes $371_1$-$371_6$ geometrically approximates a corresponding link of the robot 300. For example, bounding box $371_6$ approximates end effector 306, bounding box $371_5$ approximates the structural component that couples end effector 306 to actuator $304_5$, bounding box $371_4$ approximates the structural component that couples actuators $304_5$ to actuator $304_4$, etc. It is noted that the bounding boxes can be three-dimensional, although they are represented two-dimensionally in FIG. 3E for simplicity.

FIG. 3E also illustrates three spheres 501A, 501B, and 501C, that each correspond to an occupied voxel. An initial radius indicated by sphere 501A can be initially determined based on the distance of the occupied voxel of the sphere 501A to the current position 307 (since that distance is smaller than the distance to the target position 308). Further, it can be determined whether the sphere 501A collides with any of the bounding boxes $371_1$-$371_6$. Since it collides with bounding box $371_5$, the initially determined radius can be reduced to that indicated by sphere 501B. Further, it can be determined whether the sphere 501B collides with any of the bounding boxes $371_1$-$371_6$. Since it collides with bounding box $371_5$, the reduced radius can be further reduced to that indicated by sphere 501C. Further, it can be determined whether the sphere 501C collides with any of the bounding boxes $371_1$-$371_6$. Since it collides with bounding box $371_5$, and since the further reduced radius is a minimum radius, it can be determined that the occupied voxel corresponds to the robot 300. In response, the occupied voxel can be removed in response to determining that the occupied voxel corresponds to the robot 300. Removal of the occupied voxel may prevent that voxel from errantly being considered as an obstacle during path planning.

Figure 3F:
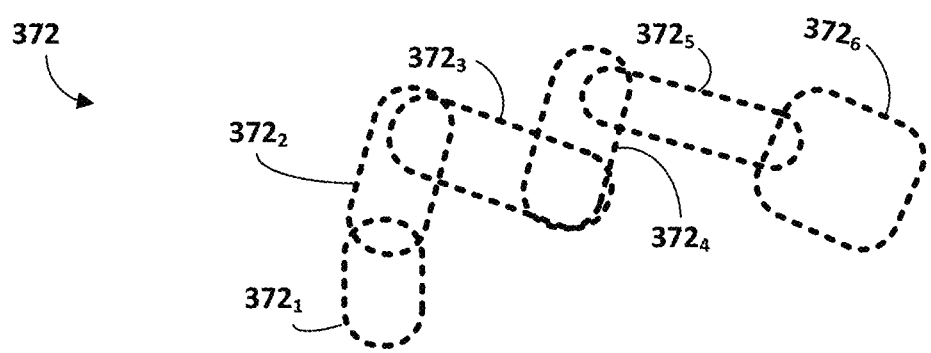
FIG. 3F illustrates another example geometric model of the example robot of FIG. 3A.

FIG. 3F illustrates another example geometric model 372 of the example robot 300. In FIG. 3F, the geometric model 372 includes a plurality of bounding volumes $372_1$-$372_6$. Each of the bounding volumes $372_1$-$372_6$ geometrically approximates a corresponding link of the robot 300. FIG. 3F is provided as one example of a geometric model that includes bounding volumes that are not bounding boxes. Such a geometric model can additionally and/or alternatively be utilized in determining whether there is a conflict with link(s) of a robot.

Figure 4:
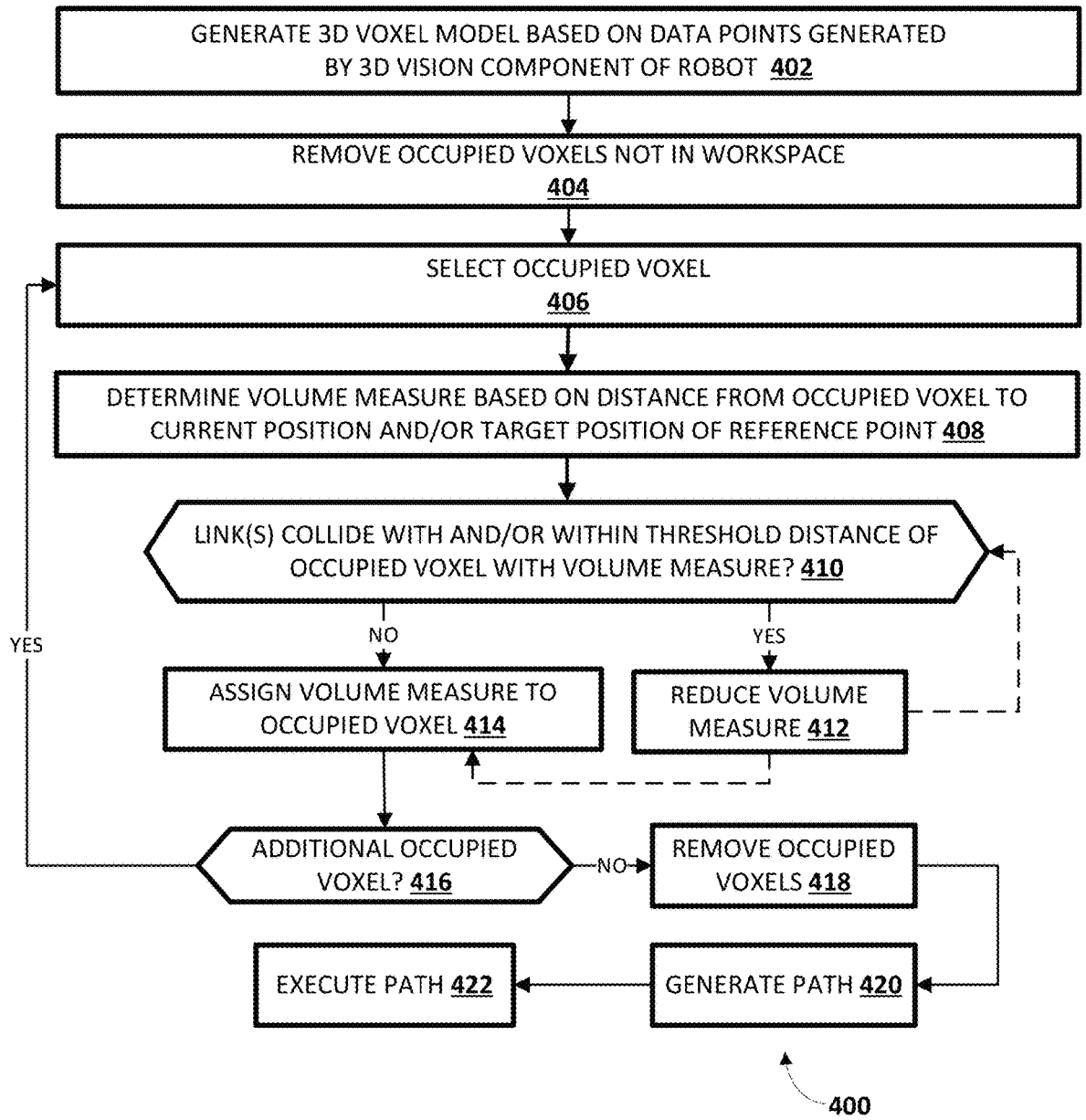
FIG. 4 is a flowchart illustrating an example method according to implementations disclosed herein.

Referring now to FIG. 4, an example method 400 according to various implementations is described. For convenience, the operations of the method 400 are described with reference to a system that performs the operations. This system may include various components of a robot and/or of one or more computing devices in communication with the robot. Moreover, while operations of method 400 are shown in a particular order, this is not meant to be limiting. One or more operations may be reordered, omitted or added.

At block 402, the system generates a 3D voxel model based on data points generated by a 3D vision component of a robot. For example, the system may receive, e.g., from a three-dimensional vision sensor of robot 100, the data points in the form of a 3D point cloud sensed by the three-dimensional vision sensor. In some implementations, the system generates the 3D voxel model based on projecting the data points onto voxels of the 3D voxel model.

At block 404, the system removes occupied voxels that are not in a workspace of the robot. In some implementations, at block 404 the system additionally and/or alternatively removes voxels based on one or more other criteria.

At block 406, the system selects an occupied voxel from the 3D voxel model.

At block 408, the system determines a volume measure for the occupied voxel based on a distance from the occupied voxel to a current position and/or a target position of a reference point of the robot.

At block 410, the system determines whether any links of the robot collide with and/or are within a threshold distance of the occupied voxel with the volume measure. In a first iteration of block 410 for a given selected voxel, the volume measure is the volume measure determined at block 408. In any subsequent iterations of block 410 for a given selected voxel, the volume measure is the volume measure determined at a most recent iteration of block 412 (described below).

At block 410, if it is determined that link(s) of the robot collide with and/or are within a threshold distance of the occupied voxel with the volume measure, the system proceeds to block 412. At block 412, the system reduces the volume measure. For example, the system can reduce the volume measure by a certain percentage and/or a certain value. The percentage and/or value at each iteration of block 412 may be the same or may vary. For example, the percentage and/or value at a given iteration of block 412 can be based on an extent of a collision determined at a most recent iteration of block 410. For instance, the volume measure can be reduced by the extent to which it is in collision with a link, such that after reduction it no longer collides with the link.

In some implementations, the system then utilizes the reduced volume measure as the volume measure and proceeds back to block 410. In some other implementations, the system performs an iteration of block 412, then proceeds from block 412 to block 414. For example, at block 412 the system can reduce the volume measure by an extent to which it is in collision (thereby ensuring it is no longer in collision), and the system can proceed from block 412 to block 414 (without first proceeding back to block 410) and assign the reduced volume measure to the occupied voxel.

In some implementations, at an iteration of block 412 the system may determine that the volume measure cannot be further reduced (e.g., the volume measure is already a "minimum" volume measure). In some of those implementations, the system may remove that occupied voxel and/or flag that occupied voxel as a "robot voxel" (e.g., it corresponds to a structural component of the robot) in response to determining that the volume measure cannot be further reduced. Stated differently, the system can assume that occupied voxel corresponds to the robot itself since even at a minimum volume measure it is still determined (at an iteration of block 410) to be in conflict with link(s) of the robot.

At block 410, if it is determined that link(s) of the robot do not collide with and/or are not within a threshold distance of the occupied voxel with the volume measure, the system proceeds to block 414. At block 414, the system assigns the volume measure to the occupied voxel, the proceeds to block 416.

At block 416, the system determines whether there are additional occupied voxels to process. If so, the system proceeds to block 406 and selects an additional unprocessed occupied voxel, then performs blocks 408, 410, optionally 412, and 414 for the additional occupied voxel. In some implementations, the system may optionally process multiple voxels in parallel.

If, at block 416, the system determines there are no additional occupied voxels to process, the system proceeds to block 418. At block 418, the system removes one or more occupied voxels. For example, the system can remove occupied voxels based on volume measures assigned to the occupied voxels. For instance, the system can randomly remove X % of the occupied voxels that have volume measures greater than A. Also, for example, the system can randomly remove X % of the occupied voxels that have volume measures between A and B, Y % of the occupied voxels that have volume measures between B and C, etc. As used herein, randomly can mean either truly randomly or pseudo-randomly.

At block 420, the system generates a path based on the occupied voxels and assigned volume measures, optionally ignoring any occupied voxels removed at blocks 418, 412, or 404. For example, the system can generate the path from the current position to the target position, while considering the occupied voxels with the assigned volume measures as obstacles to be avoided by the path.

At block 422, the system executes the generated path. For example, the system can generate control commands in real-time, and provide the control commands to actuators of the robot to effectuate the path. The control commands provided to the actuators can cause the robot to traverse through a plurality of intermediary configurations that follow the path, and before reaching a target configuration at which a reference point of the robot is at the target position.

Figure 5:
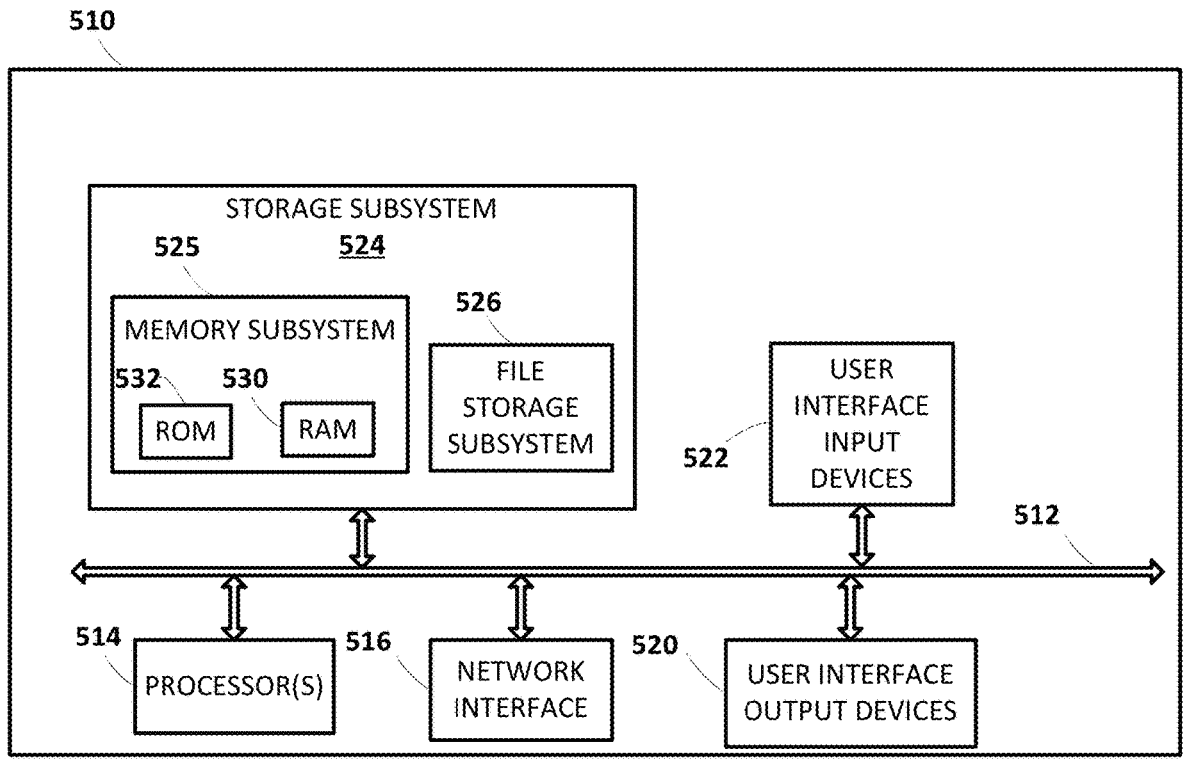
FIG. 5 illustrates an example architecture of a computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516.

The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400, and/or to implement one or more aspects of robot 100 or control system 150. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a CD-ROM drive, an optical drive, or removable media cartridges. Modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method, comprising:
   receiving data points generated by a vision component viewing an environment of a robot;
   generating a three-dimensional (3D) voxel model based on the data points, the 3D voxel model including occupied voxels that are occupied based on the received data points;
   generating a volume measure for each of the occupied voxels, wherein generating the volume measures includes generating a plurality of volume measures that are each non-uniform relative to other volume measures;
   generating a subgroup of the occupied voxels by omitting at least some of the occupied voxels of the 3D voxel model;
   generating a path, from a current position to a target position, based on the subgroup of the occupied voxels and the volume measures of the subgroup of the occupied voxels; and
   generating control commands to provide to actuators of the robot to effectuate the path.

2. The method of claim 1, wherein omitting a given occupied voxel of the occupied voxels is based on the volume measure of the given occupied voxel being larger than a threshold.

3. The method of claim 1, wherein omitting at least some of the occupied voxels comprises omitting at least a threshold percentage of the occupied voxels with corresponding volume measures larger than a threshold.

4. The method of claim 1, wherein omitting a given occupied voxel of the occupied voxels is based on determining that the given occupied voxel represents a component of the robot.

5. The method of claim 4, wherein determining that the given occupied voxel represents a component of the robot comprises:
   generating an initial volume measure for the given occupied voxel based on distance between the given occupied voxel and the at least one of the current position and the target position;
   generating one or more smaller volume measures for the given occupied voxel; and
   determining that the given occupied voxel represents a component of the robot in response to determining that the given occupied voxel with the initial volume measure collides with the robot in a current configuration of the robot and that the given occupied voxel with any of the smaller volume measures collides with the robot in the current configuration.

6. The method of claim 1, wherein the volume measures each define a corresponding radius and wherein generating the path based on the occupied voxels and the volume measures of the subgroup of the occupied voxels comprises generating the path based on a plurality of spheres each defined by a corresponding one of the occupied voxels and its radius.

7. A robot, comprising:
   robot actuators;
   a vision component;
   one or more processors operably coupled with the vision component; and
   memory operably coupled with the one or more processors, the memory storing instructions that, when executed by the one or more processors, cause the one or more processors to:
   receive data points generated by the vision component;
   generate a three-dimensional (3D) voxel model based on the data points, the 3D voxel model including occupied voxels that are occupied based on the received data points;

generate a volume measure for each of the occupied voxels, wherein in generating the volume measures one or more of the processors are to generate a plurality of volume measures that are each non-uniform relative to other volume measures;

generate a subgroup of the occupied voxels by omitting at least some of the occupied voxels of the 3D voxel model;

generate a robot path based on the subgroup of the occupied voxels and the volume measures of the subgroup of the occupied voxels; and generate control commands to provide to one or more of the robot actuators to effectuate the robot path.

8. The robot of claim 7, wherein in omitting a given occupied voxel, of the occupied voxels, in generating the subgroup, one or more of the processors are to omit the given occupied voxel based on the volume measure of the given occupied voxel being larger than a threshold.

9. The robot of claim 7, wherein in omitting a given occupied voxel, of the occupied voxels, in generating the subgroup, one or more of the processors are to omit at least a threshold percentage of the occupied voxels with corresponding volume measures larger than a threshold.

10. The robot of claim 8, wherein in omitting a given occupied voxel, of the occupied voxels, in generating the subgroup, one or more of the processors are to omit the given occupied voxel based on determining that the given occupied voxel represents a component of the robot.

11. The robot of claim 10, wherein in determining that the given occupied voxel represents a component of the robot, one or more of the processors is to:

generate an initial volume measure for the given occupied voxel based on distance between the given occupied voxel and at least one of a current position of the robot and a target position of the robot;

generate one or more smaller volume measures for the given occupied voxel; and determine that the given occupied voxel represents a component of the robot in response to determining that the given occupied voxel with the initial volume measure collides with the robot in a current configuration of the robot and that the given occupied voxel with any of the smaller volume measures collides with the robot in the current configuration.

12. The robot of claim 7, wherein the volume measures each define a corresponding radius.

13. The robot of claim 12, wherein in generating the path based on the occupied voxels and the volume measures of the subgroup of the occupied voxels, one or more of the processors is to generate the path based on a plurality of spheres each defined by a corresponding one of the occupied voxels and its radius.

14. A robot control system, comprising:

one or more processors; and memory operably coupled with the one or more processors, the memory storing instructions that, when executed by the one or more processors, cause the one or more processors to:

receive data points generated by a vision component of a robot;

generate a three-dimensional (3D) voxel model based on the data points, the 3D voxel model including occupied voxels that are occupied based on the received data points;

generate a volume measure for each of the occupied voxels, wherein in generating the volume measures one or more of the processors are to generate a plurality of volume measures that are each non-uniform relative to other volume measures;

generate a subgroup of the occupied voxels by omitting at least some of the occupied voxels of the 3D voxel model;

generate a robot path based on the subgroup of the occupied voxels and the volume measures of the subgroup of the occupied voxels; and generate control commands to provide to one or more of the robot actuators to effectuate the robot path.

15. The robot of control system of claim 14, wherein in omitting a given occupied voxel, of the occupied voxels, in generating the subgroup, one or more of the processors are to omit the given occupied voxel based on the volume measure of the given occupied voxel being larger than a threshold.

16. The robot of control system of claim 14, wherein in omitting a given occupied voxel, of the occupied voxels, in generating the subgroup, one or more of the processors are to omit at least a threshold percentage of the occupied voxels with corresponding volume measures larger than a threshold.

17. The robot control system of claim 14, wherein in omitting a given occupied voxel, of the occupied voxels, in generating the subgroup, one or more of the processors are to omit the given occupied voxel based on determining that the given occupied voxel represents a component of the robot.

18. The robot control system of claim 17, wherein in determining that the given occupied voxel represents a component of the robot one or more of the processors is to:

generate an initial volume measure for the given occupied voxel based on distance between the given occupied voxel and at least one of a current position of the robot and a target position of the robot;

generate one or more smaller volume measures for the given occupied voxel; and determine that the given occupied voxel represents a component of the robot in response to determining that the given occupied voxel with the initial volume measure collides with the robot in a current configuration of the robot and that the given occupied voxel with any of the smaller volume measures collides with the robot in the current configuration.

19. The robot control system of claim 14, wherein the volume measures each define a corresponding radius, and wherein in generating the path based on the occupied voxels and the volume measures of the subgroup of the occupied voxels, one or more of the processors is to generate the path based on a plurality of spheres each defined by a corresponding one of the occupied voxels and its radius.

* * * * *